Patented July 7, 1942

2,288,865

UNITED STATES PATENT OFFICE 2,288,865

UTILIZATION OF GASEOUS MIXTURES CONTAINING HYDROGEN HALIDE

Hans Baehr and Wilhelm Deiters, Leuna, Germany, assignors, by mesne assignments, to Jasco, Incorporated, a corporation of Louisiana No Drawing. Application August 20, 1938, Serial No. 226,007. In Germany August 20, 1937

6 Claims. (Cl. 260—677)

The present invention relates to improvements in the utilization of gaseous mixtures which contain hydrogen halide, hydrocarbons and/or halogenated hydrocarbons.

Such mixtures are especially obtained in the treatment of hydrocarbons to produce halogenated or dehydrogenated hydrocarbons and also in the catalytical treatment of halogenated hydrocarbons with agents which are capable of splitting off hydrogen halide from the halogenated hydrocarbons.

In the known manufacture of olefines and diolefines by the action upon saturated or unsaturated hydrocarbons with halogen and the separation from the halogenated hydrocarbons of hydrogen halide, a mixture of substances results which can only with difficulty be worked up in an economic manner. With a view to render the manufacture of olefines economic it is important to recuperate the halogen in such a state that it may be brought into reaction with hydrocarbons afresh without the necessity of expensive after-treatments.

According to our present invention the said objects are achieved by treating the said gaseous mixtures with a liquid which is capable of dissolving hydrogen halide and giving it off as such, but which leaves hydrocarbons and halogenated hydrocarbons undissolved, regenerating the liquid by removing at least part of the hydrogen halide from the solution and reemploying the liquid for separating the hydrogenhalide from the said mixtures.

Suitable liquids for the separation of hydrogen halide from hydrocarbons and halogenated hydrocarbons are for example water, aqueous solutions, such as of alkali chloride, alkaline earth metal chloride, phosphoric acid or sulphuric acid. Most suitable for this purpose is a concentrated aqueous solution of hydrogen chloride itself, the latter being washed out from the gas mixture at a lower temperature and, if desired, under pressure. When using as washing liquid a concentrated solution of hydrogen chloride, the contents of the latter of hydrogen chloride rises to 40 per cent and above. The separation of the hydrogen chloride from the resulting solutions is preferably performed by heating under either super- or subatmospheric pressure. The hydrogen chloride may also be recuperated from the solution by reducing the pressure and if desired by simultaneous heating of the liquid. The hydrogen halide may also be expelled by introducing gases, such as air, oxygen, nitrogen or the like. In the case of a concentrated aqueous solution of hydrogen chloride, the hydrogen chloride escapes therefrom down to about 20 to 22 percent along with a negligible admixture of steam. When applying superatmospheric pressure the solution contains less hydrogen chloride and hence lends itself especially well for recirculation. Also solutions of hydrogen chloride in alcohol, such as methanol, or in salt solutions, for instance solutions of magnesium chloride, calcium chloride, copper chloride or iron chloride, may be used as washing liquids.

The regeneration of the aqueous washing liquid may also be performed in an advantageous manner, by electrolytically decomposing it in order to split off part of the hydrogen halide, in particular hydrogen chloride, and to obtain a weaker hydrogen halide solution which may be used again for washing the initial gas mixtures. In this way the hydrogen halide washed out is recovered in the form of the corresponding free halogen which may be reemployed for the abovementioned halogenating processes which yield the said mixtures of hydrogen halide, hydrocarbons and/or halogenated hydrocarbons.

In carrying out the electrolytical decomposition the liquid is preferably led from the cathode to the anode. The diffusion of the halogen, in particular chlorine, which is produced on the anode, into the solution may be reduced by maintaining a reduced pressure in the anode chamber or by addition of common salt or sulphuric acid.

In view of a reemployment of the chlorine set free for the said chlorination processes, it is preferable to take care that the chlorine in the electrolysis is produced in a form as free from oxygen as possible. For this purpose the bath tension is kept lower than the tension necessary for the decomposition of water. In this way also losses of energy caused by a decomposition of water are avoided. In order to be sure that the content of oxygen in the chlorine gas does not become too large, it is preferable to terminate the electrolysis at a hydrogen chloride content of the solution of not lower than about 23 per cent. In cases where an oxygen content of the chlorine gas does not disturb, the electrolysis may be continued until the hydrogen chloride concentration of the solution has been reduced to about 10 to 15 per cent. The solution is then re-strengthened in the washing operation up to a concentration of about 38 per cent at 20° C. An addition of common salt or sulphuric acid is also favorable in view of a reduction of the oxygen content of the chlorine gas.

When the regeneration of the washing liquid is not carried out by electrolysis but by expelling the hydrogen halide as such out of the liquid, the halogen may also be utilized for the halogenating processes which yield the initial gas mixtures to be worked up according to our invention. This utilization consists in reconverting the recovered hydrogen halide into halogen by means of oxygen or gases containing oxygen by a manner of itself known, the halogen being then used afresh for the said halogenation processes. When using oxygen or oxygen-containing gases, such as air, for blowing out the hydrogen chloride from the washing liquid it is desirable to introduce the said gases in such amounts that the expelled mixture contains an amount of oxygen which is necessary for the oxidation of the hydrogen chloride to chlorine.

The gas mixture resulting in the oxidation of hydrogen halide to halogen, which mainly consists of halogen, hydrogen halide and unspent oxygen, is preferably reemployed for the halogenation of hydrocarbons only after the hydrogen halide and the oxygen have been removed therefrom. To this end the halogen may be liquefied in the cold, if desired under pressure, or also be washed out, as for example by means of carbon tetrachloride, chloroform or solutions of antimony trichloride or antimony tribromide in chlorinated hydrocarbons. The solutions laden with halogen may then be directly employed for the halogenation of hydrocarbons. After having been deprived of halogen by the halogenation process, they are employed afresh for the separation of halogen from the gas mixture obtained by the oxidation of the split-off hydrogen halide. The mixture remaining behind after the separation of halogen which consists of hydrogen halide and oxygen and, in some circumstances, inert gases, is preferably added to the hydrogen halide to be oxidized; this procedure ensures a full utilization of both the oxygen and the hydrogen halide.

Instead of washing out the halogen, the procedure may also be to wash out those portions of the hydrogen halide by means of solvents which had not undergone oxidation. The solution of hydrogen halide thus obtained is preferably worked up together with the solution obtained by the separation of hydrogen halide from the initial gas mixture to be worked up.

The following examples will further illustrate the nature of this invention but the invention is not restricted to these examples.

*Example 1*

A solution of 10 cubic meters of chlorine (in the gaseous state) in carbon tetrachloride is brought to act upon a mixture of 10 cubic meters of n-butylene and 10 cubic meters of butane (both in the gaseous state) in a trickling tower by allowing the chlorine solution to trickle down inside the tower and leading the hydrocarbon mixture therethrough in the same direction. The chlorination product of butylene separates in a liquid state, while the butane which has not been converted escapes from the washing tower in a gaseous state. The liquid mixture is then subjected to a fractional distillation and the dichlorobutane fraction thus formed as a vapor passed over magnesium chloride as a catalyst after a preliminary heating to about 300° C. in a furnace at a temperature of 600° C. The mixture obtained consists of butadiene and hydrogen chloride. The hydrogen chloride is then washed out therefrom by means of a solution of magnesium chloride to such an extent that the butadiene only still contains about 0.3 per cent of hydrogen chloride. The solution of magnesium chloride is heated whereby 17 cubic meters of hydrogen chloride free from hydrocarbons are obtained.

The hydrogen chloride thus obtained is mixed with 5 cubic meters of oxygen, heated to 250° C. and then passed over a copper-chloride catalyst, whereby the hydrogen chloride is burnt to water and chlorine. When cooling the reaction mixture water separates. The final gas contains about 6.5 cubic meters of chlorine, about 4 cubic meters of hydrogen chloride not having been converted. The said final gas is then washed at about 10° C. with the first runnings of the distillation of the chlorination product, which mainly consists of carbon tetrachloride. The solution of chlorine and carbon tetrachloride obtained is returned to the trickling tower for chlorination purposes. The gas mixture which has not been dissolved by carbon tetrachloride consists of 4 cubic meters of hydrogen chloride and 1.7 cubic meters of oxygen. This mixture is returned into the catalyst chamber where the regenerated hydrogen chloride is burnt.

The butadiene obtained is freed from any slight admixtures of hydrogen chloride by a washing with alkali or alkaline-earth liquors or by a passage over oxides of the alkali or alkaline-earth metals at about 300° C. It is then purified in known manner by distillation.

*Example 2*

A gas mixture obtained by splitting dichlorbutane at 450° C. over magnesium chloride as a catalyst, which gas mixture consists of about 60 per cent of hydrogen chloride and 40 per cent of hydrocarbons, more particularly butadiene and ethylene, is introduced into a washing tower and aqueous hydrochloric acid containing 22 per cent of hydrogen chloride is caused to trickle over it thus washing out the hydrogen chloride from the gas mixture except for a remainder of 0.05 per cent. From the washing tower hydrochloric acid of 36 per cent strength flows off. It is heated to boiling in a column, hydrogen chloride escaping in an almost anhydrous state. At the bottom of the column an aqueous hydrochloric acid of from 21 to 22 per cent strength is withdrawn which is cooled and returned to the washing tower.

The hydrogen chloride thus obtained is mixed with oxygen and burned to chlorine and water over a copper-chloride catalyst as in Example 1.

*Example 3*

A mixture of 40 cubic meters of hydrogen chloride and 10 cubic meters of oxygen is led at 450° C. over a copper-containing catalyst in order to convert the hydrogen halide to chlorine. The obtained gas mixture mainly consists of 15 cubic meters of water vapor, 10 cubic meters of hydrogen chloride, 15 cubic meters of chlorine and 2.5 cubic meters of oxygen. The gas mixture is washed with an aqueous solution which contains about 5 per cent of magnesium chloride and about 17 per cent of hydrogen chloride. In this way the hydrogen chloride content of the gas mixture is reduced down to 0.05 per cent and the hydrogen chloride content of the washing liquid increases to 25 per cent. The washing liquid is then heated to boiling, the amount of hydrogen chloride absorbed in the washing operation being thereby expelled and recovered. The liquid which now contains again but 17 per cent of hydrogen chloride, serves after cooling anew as washing liquid.

The water content of the gas mixture leaving the copper catalyst has been reduced during the washing with the magnesium chloride solution down to 3 grams per cubic meter. A complete drying is effected by treating the gas mixture with concentrated sulphuric acid. After this treatment the mixture is compressed in order to separate and recover the chlorine and the remaining oxygen is reintroduced into the initial gas mixture before the copper catalyst.

Example 4

A gas mixture of 40 per cent (by volume) of gaseous hydrocarbons (mainly butadiene and small amounts of butylene and propylene) and 60 per cent of hydrogen chloride, which mixture has been obtained by splitting dichlorbutane, is washed in countercurrent with aqueous hydrogen chloride solution of a concentration of 22 per cent (by weight). After this treatment the mixture contains but small amounts of hydrogen chloride.

When the hydrogen chloride content of the washing liquid has reached a concentration of about 38 per cent (by weight), the washing liquid is led with slow velocity through an electrolysis apparatus provided with a cathode of platinum and an anode of graphite. The electrolysis is carried out at 20° C. in such a manner that the liquid leaves the apparatus with a hydrogen chloride content of 22 per cent. In order to remove the remainders of chlorine contained in the liquid, the latter is strongly washed with butylene. Then the liquid is reintroduced into the washing tower for the initial gas mixture.

What we claim is:

1. A process for the working up of gaseous mixtures containing hyrogen chloride and compounds selected from the class consisting of hydrocarbons and chlorinated hydrocarbons, which comprises washing the said mixtures with a constant boiling solution of hydrogen chloride, such a solution being capable of dissolving hydrogen chloride and capable of giving it off as such but which leaves hydrocarbons and chlorinated hydrocarbons undissolved, regenerating the solution by removing the dissolved hydrogen chloride to such an extent as is necessary to restore the original concentration of the solution, re-employing the regenerated solution for separating hydrogen chloride from mixtures of the said type, converting the hydrogen chloride into chlorine and returning the latter to a chlorinating process which yields mixtures of the said type.

2. A process for the working up of gaseous mixtures containing hydrogen chloride and compounds selected from the class consisting of hydrocarbons and chlorinated hydrocarbons which comprises washing the said mixtures with a constant boiling aqueous solution of hydrogen chloride, such a solution being capable of dissolving hydrogen chloride and capable of giving it off as such, but which leaves hydrocarbons and chlorinated hydrocarbons undissolved, regenerating the solution by removing the dissolved hydrogen chloride to such an extent as is necessary to restore the original concentration of the solution by heating, re-employing the regenerated solution for separating hydrogen chloride from mixtures of the said type, converting the separated hydrogen chloride into chlorine and returning the latter to a chlorinating process which yields mixtures of the said type.

3. A process for the working up of gaseous mixtures containing hydrogen chloride and compounds selected from the class consisting of hydrocarbons and chlorinated hydrocarbons, which comprises washing the said mixtures with a constant boiling aqueous solution of hydrogen chloride, such a solution being capable of dissolving hydrogen chloride and capable of giving it off as such, but which leaves hydrocarbons and chlorinated hydrocarbons undissolved, regenerating the solution by removing the dissolved hydrogen chloride to such an extent as is necessary to restore the original concentration of the solution by reducing the pressure, re-employing the regenerated liquid for separating hydrogen chloride from mixtures of the said type, converting the separated hydrogen chloride into chlorine and returning the latter to a chlorinating process which yields mixtures of the said type.

4. A process for the working up of gaseous mixtures containing hydrogen chloride and compounds selected from the class consisting of hydrocarbons and chlorinated hydrocarbons, which comprises washing the said mixtures with a constant boiling aqueous solution of hydrogen chloride, such a solution being capable of dissolving hydrogen chloride and capable of giving it off as such, but which leaves hydrocarbons and chlorinated hydrocarbons undissolved, regenerating the solution by removing the dissolved hydrogen chloride to such an extent as is necessary to restore the original concentration of the solution by introducing gases, re-employing the regenerated liquid for separating hydrogen chloride from mixtures of the said type, converting the separated hydrogen chloride into chlorine and returning the latter to a chlorinating process which yields mixtures of the said type.

5. A process for the working up of gaseous mixtures containing hydrogen chloride and compounds selected from the class consisting of hydrocarbons and chlorinated hydrocarbons, which comprises washing the said mixtures with a constant boiling aqueous solution of hydrogen chloride, such a solution being capable of dissolving hydrogen chloride and capable of giving it off as such, but which leaves hydrocarbons and chlorinated hydrocarbons undissolved, regenerating the solution and at the same time generating chlorine by subjecting the solution to electrolysis thus splitting up part of the hydrogen chloride and re-employing the regenerated solution for separating the hydrogen chloride from mixtures of the said type, and returning the chlorine generated in the electrolysis to a chlorinating process which yields mixtures of the said type.

6. A process of preparing unsaturated hydrocarbons which comprises chlorinating hydrocarbons and dechlorinating the chlorinated compounds while in the gaseous state washing the gaseous mixture with a constant boiling aqueous solution of hydrogen chloride which is capable of dissolving hydrogen chloride and capable of giving it off as such but which leaves hydrocarbons and chlorinated hydrocarbons undissolved, regenerating the solution by removing the dissolved hydrogen chloride to such an extent as is necessary to restore the original concentration of the solution, re-employing the regenerated solution for separating hydrogen chloride from said gaseous mixtures, converting the separated hydrogen chloride into chlorine and returning the latter to the initial chlorinating step.

HANS BAEHR.
WILHELM DEITERS.